(12) United States Patent
Konnail et al.

(10) Patent No.: US 10,821,922 B2
(45) Date of Patent: Nov. 3, 2020

(54) POWER CONTROL SYSTEM

(71) Applicant: TEXAS INSTRUMENTS INCORPORATED, Dallas, TX (US)

(72) Inventors: George Konnail, Addison, TX (US); Angelo Pereira, Plano, TX (US); Hasibur Rahman, Wylie, TX (US); Xiaochun Zhao, Allen, TX (US); Artur Juliusz Lewinski, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 313 days.

(21) Appl. No.: 15/212,535

(22) Filed: Jul. 18, 2016

(65) Prior Publication Data
US 2018/0018012 A1    Jan. 18, 2018

(51) Int. Cl.
*G06F 1/32* (2019.01)
*B60R 16/03* (2006.01)
*G06F 1/3203* (2019.01)
*G06F 1/3287* (2019.01)

(52) U.S. Cl.
CPC ............ *B60R 16/03* (2013.01); *G06F 1/3203* (2013.01); *G06F 1/3287* (2013.01)

(58) Field of Classification Search
CPC .................................................. G06F 1/3287
USPC ......................................................... 713/324
See application file for complete search history.

(56) References Cited

U.S. PATENT DOCUMENTS

| | | | | |
|---|---|---|---|---|
| 4,763,238 A | * | 8/1988 | Maige ................... | H02H 7/1213 363/21.07 |
| 5,365,122 A | * | 11/1994 | Rackley ................. | H03K 5/125 327/306 |
| 5,510,741 A | * | 4/1996 | Childs .................... | H03K 17/22 327/143 |
| 6,081,460 A | * | 6/2000 | Lim et al. ............. | G11C 11/409 365/189.11 |
| 6,385,060 B1 | * | 5/2002 | Basso ..................... | H02M 1/32 363/21.07 |
| 6,597,073 B1 | * | 7/2003 | Check ....................... | G06F 1/30 307/130 |
| 7,232,176 B1 | * | 6/2007 | Dopwell .................... | B60J 3/00 296/97.9 |
| 2005/0248964 A1 | * | 11/2005 | Dalal ................. | H02M 3/33592 363/21.08 |

(Continued)

*Primary Examiner* — Volvick Derose
(74) *Attorney, Agent, or Firm* — Lawrence J. Bassuk; Charles A. Brill; Frank D. Cimino

(57) ABSTRACT

One example includes a power control system. The power control system includes an activation controller that is powered via a first power voltage generated via a first power supply and is configured to provide an enable signal. The activation controller can assert the enable signal in response to an input activation signal to control activation of a second power supply. The second power supply can generate a second power voltage in response to the enable signal being asserted. The second power voltage can be provided to regulate power associated with ancillary electronic circuitry. The system also includes a deactivation controller that is powered via the second power voltage and is configured to generate a disable signal to de-assert the enable signal in response to one of a plurality of predetermined deactivation conditions.

14 Claims, 2 Drawing Sheets

(56) References Cited

U.S. PATENT DOCUMENTS

| | | | |
|---|---|---|---|
| 2006/0256491 A1* | 11/2006 | Nakajima | G06F 1/26 361/90 |
| 2007/0263421 A1* | 11/2007 | Kyono | H02M 3/33592 363/127 |
| 2008/0301481 A1* | 12/2008 | Cheng | G06F 1/3203 713/323 |
| 2009/0119528 A1* | 5/2009 | Yang et al. | G06F 1/00 713/323 |
| 2010/0164538 A1* | 7/2010 | Greimel-Rechling | H03K 19/1732 326/16 |
| 2010/0231044 A1* | 9/2010 | Tatsumi et al. | H02J 1/00 307/39 |
| 2015/0280766 A1* | 10/2015 | Wei | H04B 1/3816 455/558 |

* cited by examiner

POWER CONTROL SYSTEM

TECHNICAL FIELD

This disclosure relates generally to electronic systems, and more specifically to a power control system.

BACKGROUND

Power delivery systems are implemented for a large variety of applications to provide and conserve power for operation of electronic devices. For example, a number of electronic systems, such as industrial or automotive systems, supply power from a battery to operate certain features or devices of the overall system, but disable other systems when the overall system is not activated. In the example of an automotive power system, the battery may be used to provide power to certain electronic systems when the respective vehicle is not running (e.g., in the absence of an ignition signal). However, it may be desirable to disable other electronic systems when the vehicle is not running to satisfy low power consumption requirements.

SUMMARY

One example includes a power control system. The power control system includes an activation controller that is powered via a first power voltage generated via a first power supply and is configured to provide an enable signal. The activation controller can assert the enable signal in response to an input activation signal to control activation of a second power supply. The second power supply can generate a second power voltage in response to the enable signal being asserted. The second power voltage can be provided to regulate power associated with ancillary electronic circuitry. The system also includes a deactivation controller that is powered via the second power voltage and is configured to generate a disable signal to de-assert the enable signal in response to one of a plurality of predetermined deactivation conditions.

Another example includes a method for controlling a power control system. The method includes providing a first power voltage generated via a first power supply to an activation controller. The method also includes comparing an amplitude of an input activation signal with a predetermined threshold via the activation controller and activating a trigger signal via the activation controller in response to the amplitude of the input activation signal exceeding the predetermined threshold. The method further includes latching an enable signal via the activation controller in response to the trigger signal, the enable signal being provided to activate a second power supply to provide a second power voltage.

Another example includes a vehicular power system. The system includes a first power supply that is powered via a vehicle battery and configured to generate a first power voltage. The system also includes an activation controller that is powered via the first power voltage and is configured to generate a trigger signal in response to an ignition signal. The activation controller can assert an enable signal in response to the trigger signal. The system also includes a second power supply that generates a second power voltage in response to assertion of the enable signal, the second power voltage being provided to regulate power associated with ancillary electronic circuitry. The system further includes a deactivation controller that is powered via the second power voltage and is configured to assert a disable signal to de-assert the enable signal in response to one of a plurality of predetermined deactivation conditions.

DETAILED DESCRIPTION

This disclosure relates generally to electronic systems, and more specifically to a power control system. The power control system can be implemented, for example, as a vehicular power control system in any of a variety of vehicles that implement an ignition signal that indicates an engine-running condition. The power control system includes an activation controller that is powered from a first power voltage generated via a first power supply and is configured to generate an enable signal in response to a trigger signal. The enable signal can be provided to activate a second power supply that can provide power to ancillary electronic components (e.g., control systems associated with the vehicle). For example, the first power supply can be powered by a vehicle battery, and the trigger signal can be generated based on an ignition signal corresponding to an engine-running (or equivalent) condition. As an example, the activation controller can include a latch (e.g., an SR-latch) that is configured to latch the enable signal in response to the trigger signal, and to unlatch the enable signal in response to a disable signal.

The power control system can also include a deactivation controller that is powered by the second power voltage and is configured to provide a disable signal. The deactivation controller can provide the disable signal to the activation controller to deactivate (e.g., unlatch) the enable signal. The deactivation controller can include a deglitch circuit configured to assert a deglitch output in response to the trigger signal being activated for a predetermined time duration to maintain deactivation of the disable signal to allow the enable signal to be latched. The deactivation controller can also include a pulse generator configured to periodically generate a pulse signal to activate the disable signal in response to deactivation of the trigger signal. Furthermore, the deactivation controller can include a state machine configured to cause activation of the disable signal in response to one of a plurality of predetermined state conditions unrelated to the trigger signal. The components of the deactivation controller can be logically combined to operate in conjunction with each other to activate or deactivate the disable signal.

Figure 1:
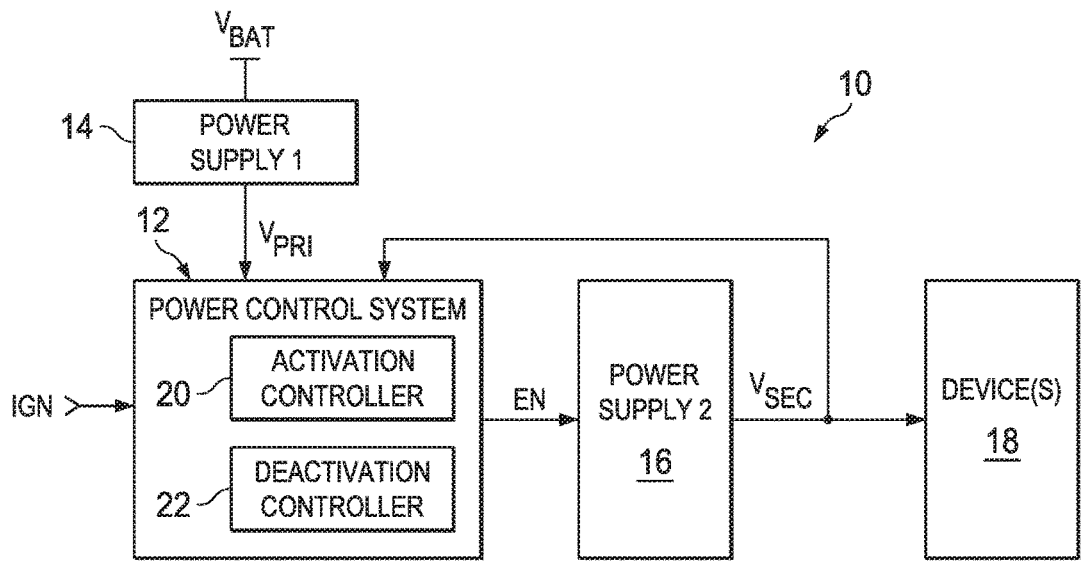
FIG. 1 illustrates an example of a power system.

FIG. 1 illustrates an example of a power system 10. The power system 10 can correspond to any of a variety of power systems, such as including a battery as a main power supply. For example, the power system 10 can correspond to a vehicular power system, an industrial power system, or any of a variety of other power systems.

The power system 10 includes a power control system 12 that is configured to activate and deactivate (e.g., turn ON and OFF) an enable signal EN based on an input activation signal. In examples herein, the input activation signal is demonstrated as IGN, which can correspond to a vehicle ignition signal (e.g., provided on an ignition pin of an associated integrated circuit (IC)). The power system 10 also includes a first power supply 14 that is powered by a battery voltage $V_{BAT}$ (e.g., a vehicular battery) and is configured to generate a first power voltage $V_{PRI}$, and a second power supply 16 that is configured to generate a second power voltage $V_{SEC}$. In the example of FIG. 1, the power control system 12 provides the enable signal EN, upon being activated, to the second power supply 16 to activate the second power supply 16 to generate the second power voltage $V_{SEC}$ at a corresponding output thereof. The second power voltage $V_{SEC}$, in addition to being provided to the power control system 12, is configured to provide power from its output to one or more ancillary electronic devices 18. As an example, the ancillary electronic device(s) 18 can correspond to any of a variety of vehicle electronic systems, which can be implemented on one or more integrated circuit (IC) chips, such as driver controls, navigation, stereo, illumination, temperature and environment controls, or a variety of other electronic systems.

The power control system 12 includes an activation controller 20 and a deactivation controller 22. The activation controller 20 can be powered by the first power voltage $V_{PRI}$ and can, for example, be configured to activate the enable signal in response to a trigger signal that is generated based on the input activation signal IGN. As an example, the activation controller 20 can include circuitry (e.g., logic) that is configured to latch the enable signal in response to the trigger signal, such that the enable signal EN can remain asserted to maintain activation of the second power supply 16, regardless of the state of the input activation signal IGN. The deactivation controller 22 can be coupled to the output of the second power supply 16 to receive the second power voltage $V_{SEC}$. The deactivation controller 22 can be configured to deactivate (e.g., unlatch) the enable signal in response to a plurality of predetermined conditions, as described in greater detail herein. As an example, the predetermined conditions can include a state of the trigger signal (e.g., based on the input activation signal IGN) and/or faults (e.g., vehicle faults or processor power-down) unrelated to the input activation signal IGN.

As described herein, the power control system 12 can thus provide compliance with strict low power consumption requirements by separating the power supply that is provided for the ancillary electronic device(s) 18 (e.g., the second power supply 16) from the input activation signal IGN via the interaction between the activation controller 20 and the deactivation controller 22. Additionally, the activation controller 20 and the deactivation controller 22 can provide detection and de-bounce control of the input activation signal IGN to maintain deactivation of the associated IC(s) (e.g., associated with the ancillary circuit(s) 18) until the input activation signal IGN has a sufficient amplitude (e.g., with respect to a predetermined threshold) for proper operation of the electronic systems associated with the ancillary circuit(s) 18, and thus to conserve power from an associated battery.

Figure 2:
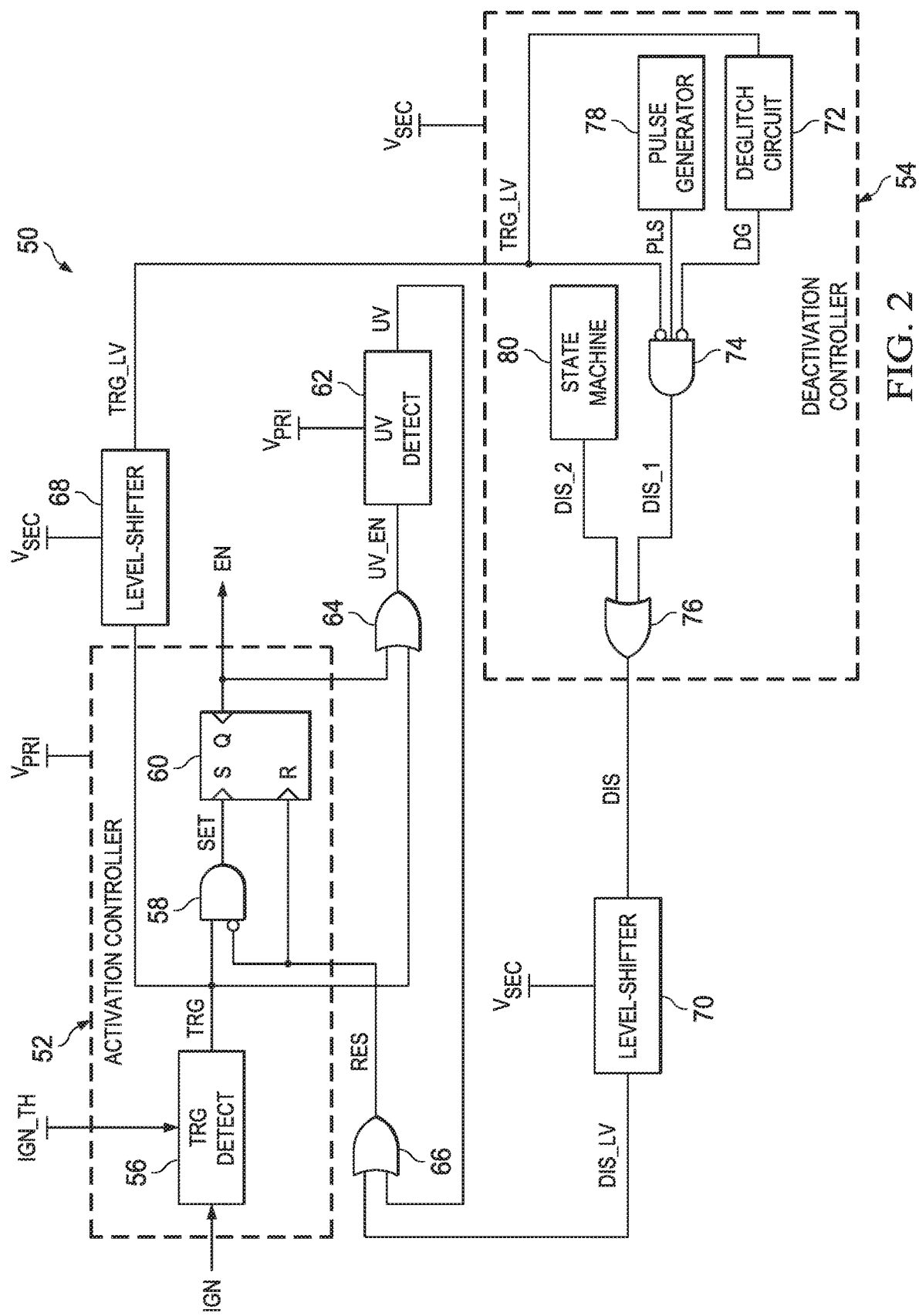
FIG. 2 illustrates an example of a power control system.

FIG. 2 illustrates an example of a power control system 50. As an example, the power control system 50 can correspond to the power control system 12 in the example of FIG. 1. Thus, the power control system 50 can be implemented in a power system (e.g., the power system 10) that can be implemented as a vehicular power system, an industrial power system, or any of a variety of other power systems, such as powered via a battery. In the example of FIG. 2, the power control system 50 is configured to activate and deactivate an enable signal EN based on an ignition signal IGN, which can correspond to a vehicle ignition signal (e.g., provided on an ignition pin of an associated integrated circuit (IC)). The enable signal EN can thus be provided to activate a power supply (e.g., the second power supply 16) that is configured to provide the voltage $V_{SEC}$.

The power control system 50 includes an activation controller 52 and a deactivation controller 54. The activation controller 52 is powered by a first power voltage $V_{PRI}$ that can be generated by the first power supply 14 (e.g., powered by the battery voltage $V_{BAT}$). The activation controller 52 includes a trigger detection circuit 56 that is configured to detect when the ignition signal IGN has an amplitude that is greater than a predetermined threshold amplitude, demonstrated as a signal IGN_TH in the example of FIG. 2, and to assert a trigger signal TRG in response to the ignition signal IGN having a predetermined amplitude relative to the predetermined threshold amplitude IGN_TH. The trigger signal TRG can thus be asserted or de-asserted as a digital signal having predetermined logic-high and logic-low amplitudes. The trigger signal is provided to a first input of a logic AND-gate 58 that is configured to generate a set signal SET. The logic AND-gate 58 has a second inverting input that receives a reset signal RES.

The set signal SET is provided to a set-input of an SR-latch 60 that is configured to assert the enable signal EN at an output in response to the assertion of the trigger signal TRG. The SR-latch 60 also includes a reset-input that receives the reset signal RES. The enable signal EN can be output from the power control system 50 to activate a power supply that is configured to generate a power voltage $V_{SEC}$ (e.g., the power voltage $V_{SEC}$ generated via the second power supply 16 in the example of FIG. 1). Therefore, in response to the trigger signal TRG being asserted, the enable signal EN is latched until the reset signal RES is asserted. For example, the ignition signal IGN may increase in amplitude very slowly (0.5V/min), such as based on being included in a power system in which the IGN pin is connected directly to a battery. Additionally, the ignition signal IGN may "chatter" in amplitude before achieving a sufficient amplitude, such as at an amplitude approximately equal to the detection threshold set by the signal IGN_TH. Therefore, the trigger detection circuit 56 asserts the trigger signal TRG to assert the enable signal EN only when the ignition signal IGN achieves a sufficient amplitude, and the SR-latch 60 latches the enable signal EN to de-bounce the ignition signal IGN.

The power control system 50 also includes an under-voltage detector 62 that is configured to monitor the amplitude of the first power voltage $V_{PRI}$ to determine an under-voltage condition associated with the first power voltage $V_{PRI}$. The under-voltage detector 62 receives an under-voltage enable signal UV_EN that is generated via a logic-OR gate 64 having the enable signal EN and the trigger signal TRG as inputs. Thus, the under-voltage enable signal UV_EN is logic-high if either of the enable signal EN and the trigger signal TRG are asserted to enable operation of the under-voltage detector 62. When enabled, the under-voltage detector 62 can thus monitor the amplitude of the of the first power voltage $V_{PRI}$, and in response to the first power voltage $V_{PRI}$ being less than a predetermined threshold, the under-voltage detector 62 is configured to assert an under-voltage detection signal UV that is provided to a logic-OR gate 66 that is configured to generate the reset signal RES. Accordingly, in response to an under-voltage condition with respect to the first power voltage $V_{PRI}$, the reset signal RES is asserted to de-assert the enable signal EN. Accordingly, in response to de-asserting the enable signal EN, the power control system 50 can deactivate the second power supply 16 during the under-voltage condition of the first power voltage $V_{PRI}$.

The power control system 50 also includes a first level-shifter 68 that is powered by the second power voltage $V_{SEC}$, and is thus not active unless the enable signal EN is asserted. The first level-shifter 68 is configured to provide level-shifting of the voltage associated with the trigger signal TRG to generate a level-shifted trigger signal TRG_LV. As an example, the level-shifted trigger signal TRG_LV can have an amplitude that is less than the trigger signal TRG. The level-shifted trigger signal TRG_LV is provided to an input of the deactivation controller 54. The deactivation controller 54 is configured to generate a disable signal DIS that can be asserted to unlatch and de-assert the enable signal EN. In the example of FIG. 2, the disable signal DIS is provided to a second level-shifter 70 to provide level-shifting of the voltage associated with the disable signal DIS to generate a level-shifted disable signal DIS_LV. The level-shifted disable signal DIS_LV is provided as an input to the logic-OR gate 66. Therefore, in response to assertion of the level-shifted disable signal DIS_LV, and corresponding to the disable signal DIS, the logic-OR gate 66 asserts the reset signal RES to reset the latch 60 and thereby de-assert the enable signal EN (e.g., to logic-low).

The deactivation controller 54 is powered by the second power voltage $V_{SEC}$, and is activated in response to the enable signal EN being asserted (e.g., logic-high) via the activation controller 52. The deactivation controller 54 includes a deglitch circuit 72 that is configured to ensure that the disable signal DIS is not asserted during activation of the enable signal EN via the trigger signal TRG. The deglitch circuit 72 is configured to receive the level-shifted trigger signal TRG_LV as an input and to provide a deglitch signal. The deglitch circuit 72 asserts the deglitch signal DG (e.g., to logic-high) in response to the level-shifted trigger signal TRG_LV being activated for a predetermined time duration. The deglitch signal DG is provided to an inverting input of a logic-AND gate 74 that is configured to generate a first disable condition signal DIS_1. Therefore, upon the deglitch circuit 72 asserting the deglitch signal DG in response to the level-shifted trigger signal TRG_LV being activated for a predetermined time duration, the logic-AND gate 74 de-asserts the first disable condition signal DIS_1. In the example of FIG. 2, the first disable condition signal DIS_1 is provided as a first input to a logic-OR gate 76 and a second disable condition signal DIS_2 is provided to a second input. The logic-OR gate 76 is configured to generate the disable signal DIS. Accordingly, in response to a deglitched assertion of the level-shifted trigger signal TRG_LV, and thus the trigger signal TRG, the first disable condition signal DIS_1 is de-asserted to potentially deactivate the disable signal DIS, and thus allow the enable signal EN to be activated via the trigger signal TRG. Accordingly, the deglitch circuit 72 further allows the power control system 50 to de-bounce the ignition signal IGN in deactivating the enable signal EN.

The deactivation controller 54 also includes a pulse generator 78 that is configured to periodically assert a pulse signal PLS. The frequency and duty-cycle of the pulse signal PLS can be set to default value or can be programmable. The pulse signal PLS is provided to an input of the logic-AND gate 74 and the level-shifted trigger signal TRG_LV is provided to an inverting input of the logic-AND gate 74. Thus, the logic-AND gate 74 is provided with a logic-high state of the pulse signal PLS at each of a periodic time period (e.g., one clock cycle every millisecond) to assert the first disable condition signal DIS_1 in response to the level-shifted trigger signal TRG_LV being de-asserted. Therefore, the pulse signal PLS can activate the disable signal DIS in response to deactivation of the level-shifted trigger signal TRG_LV, and thus the trigger signal TRG. As a result, if the trigger signal TRG, and thus the level-shifted trigger signal TRG_LV, is de-asserted based on a decrease (e.g., de-assertion) of the ignition signal IGN before the deglitch signal DG is asserted (e.g., based on a chatter of the ignition signal IGN), the pulse signal PLS can operate to reset the enable signal EN (e.g., set to logic-low).

Furthermore, the deactivation controller 54 includes a state machine 80 that is configured to generate a second disable condition signal DIS_2. The second disable condition signal DIS_2 is provided to the logic-OR gate 76 along with the first disable condition signal DIS_1, such that the logic-OR gate 76 is configured to activate (e.g., assert) the disable signal DIS in response to either of the first disable condition signal DIS_1 or second disable condition signal DIS_2. As an example, the state machine 80 can assert the second disable condition signal DIS_2 in response to any of a plurality of predetermined state conditions, such as unrelated to the power control system 50, and thus the ignition signal IGN. For example, faults associated with the associated vehicle or industrial application can be monitored by the state machine 80, such that the state machine 80 can assert the second disable condition signal DIS_2 in response to the occurrence of an associated fault. Therefore, the occurrence of such faults or other external systems monitored by the state machine 80 can result in activation of the disable signal DIS, and thus unlatching and de-asserting of the enable signal EN. Accordingly, the second power supply 16 can be powered down by unlatching the enable signal EN in response to any internal events, or if the associated control processor initiates a power down event. As an example, the state machine 80 can maintain a logic-high state of the second disable condition signal DIS_2 until the second power voltage $V_{SEC}$ discharges to a low enough amplitude to reset the associated digital processor via an under-voltage condition detection, thus ensuring that the second power voltage $V_{SEC}$ is completely discharged before the enable signal EN can be activated again.

Accordingly, the power control system 50 can thus comply with strict low power consumption requirements by implementing separate power supplies for the activation controller 52 and the deactivation controller 54. Thus, the enable signal EN is provided to a separate power supply that generates the second power voltage $V_{SEC}$ (e.g., the second power supply 16) from the power supply that generates the first power voltage $V_{PRI}$ (e.g., the first power supply 14). As a result, the ignition signal IGN is isolated from the second power supply to isolate the ancillary electronic device(s) to mitigate power consumption of the associated power system, and thus to conserve power from an associated battery. In addition, the activation controller 52 and the deactivation controller 54, as described herein, can provide detection and de-bounce control of the ignition signal IGN to maintain deactivation of the associated IC(s) (e.g., associated with the ancillary circuit(s) 58) until the ignition signal IGN has a sufficient amplitude for proper operation of the electronic systems associated with the ancillary circuit(s). Furthermore, as an example, the logic-gates of the power control system 50 (e.g., the logic-AND gate 58, the logic-OR gate 64, the logic-OR gate 66, the logic-AND gate 74, and the logic-OR gate 76) can all operate based on the first power voltage $V_{PRI}$, which can be generated via an associated battery (e.g., the battery voltage $V_{BAT}$). As a result, the amplitude of the ignition signal IGN can be detected, along with changes therein, even if none of the internal voltage rails (e.g., based on the second power voltage $V_{SEC}$) are activated via the enable signal EN.

Figure 3:
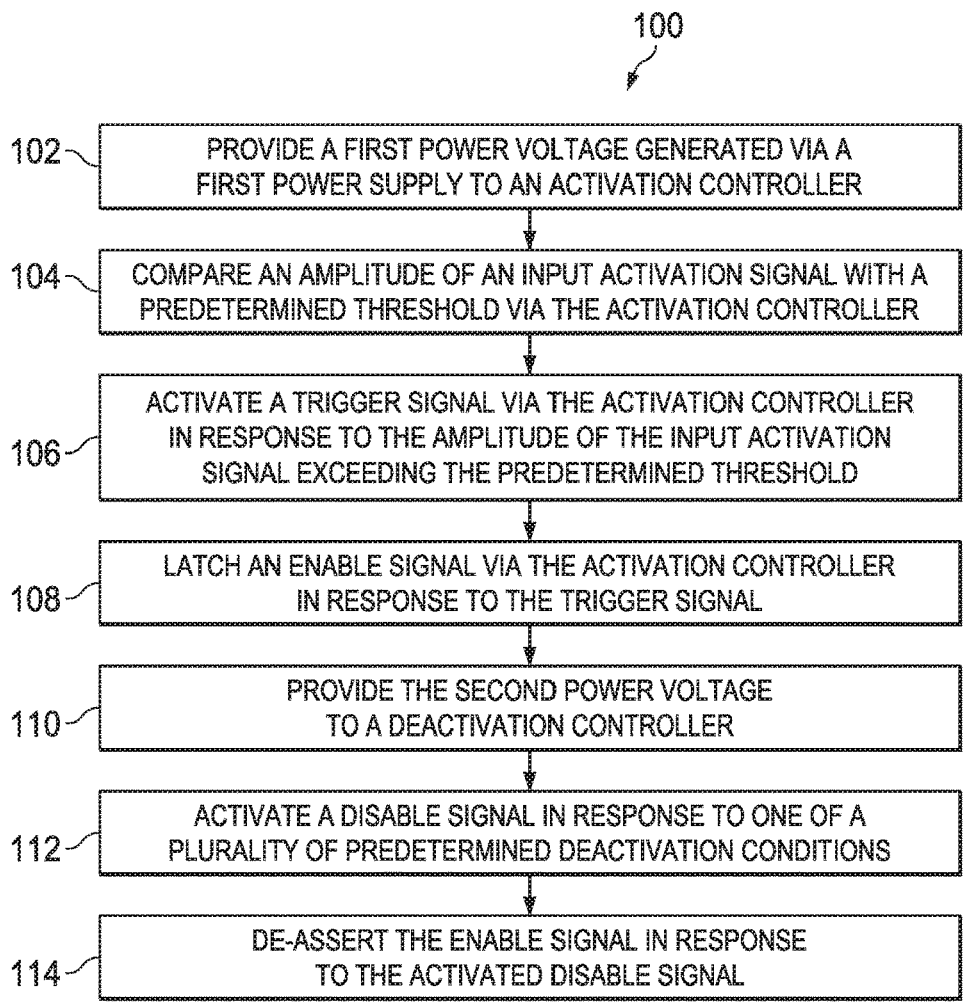
FIG. 3 illustrates an example of a method for controlling a power supply system.

In view of the foregoing structural and functional features described above, a method in accordance with various aspects of the present disclosure will be better appreciated with reference to FIG. 3. While, for purposes of simplicity of explanation, the method of FIG. 3 is shown and described as executing serially, it is to be understood and appreciated that the present disclosure is not limited by the illustrated order, as some aspects could, in accordance with the present disclosure, occur in different orders and/or concurrently with other aspects from that shown and described herein. Moreover, not all illustrated features may be required to implement a method in accordance with an aspect of the present disclosure.

FIG. 3 illustrates a method 100 for controlling a power control system (e.g., the power control system 12). At 102, a first power voltage (e.g., the first power voltage $V_{PRI}$) generated via a first power supply (e.g., the first power supply 14) is provided to an activation controller (e.g., the activation controller 20). At 104, an amplitude of an input activation signal (e.g., the input activation signal IGN) is compared with a predetermined threshold (e.g., the ignition threshold IGN_TH) via the activation controller. At 106, a trigger signal (e.g., the trigger signal TRG) is activated via the activation controller in response to the amplitude of the input activation signal exceeding the predetermined threshold. At 108, an enable signal (e.g., the enable signal EN) is latched via the activation controller in response to the trigger signal. The enable signal is provided to activate a second power supply (e.g., the second power supply 16) to provide a second power voltage (e.g., the second power voltage $V_{SEC}$). At 110, the second power voltage is provided to a deactivation controller (e.g., the deactivation controller 22). At 112, a disable signal (e.g., the disable signal DIS) is activated in response to one of a plurality of predetermined deactivation conditions (e.g., the disable condition signals DIS_1 and DIS_2). At 114, the enable signal is de-asserted in response to the activated disable signal.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. An integrated circuit comprising:
   (a) a primary power supply input and a secondary power supply input;
   (b) activation circuitry coupled to the primary power supply input and receiving power only from the primary power supply input, the activation circuitry including:
      trigger detect circuitry having a control input, a control threshold input, and a trigger output;
      a first AND gate having a trigger input coupled to the trigger output, having a reset input, and having a set output; and
      latch circuitry having a set input coupled to the set output, having a reset input coupled to the reset input of the first AND gate, and having a secondary power supply enable output; and
   (b) deactivation circuitry coupled to the secondary power supply input and receiving power only from the secondary power supply input, the deactivation circuitry including:
      pulse generator circuitry having a pulse output;
      deglitch circuitry having an input coupled to the trigger output and having a deglitch output; and
      a second AND gate having an input coupled to the trigger output, an input coupled to the pulse output, an input coupled to the deglitch output, and having a first disable input coupled to the reset input of the first AND gate.

2. The integrated circuit of claim 1 in which the control input is an ignition input.

3. The integrated circuit of claim 1 including in which the latch circuitry is a set-reset latch.

4. The integrated circuit of claim 1 including trigger level shifter circuitry having an input coupled to the trigger output, a power input coupled to the secondary power supply input, and a level shifted trigger output coupled to the trigger input of the deglitch circuitry and to the trigger input of the second AND gate.

5. The integrated circuit of claim 1 including under-voltage detection circuitry having a power input coupled to the primary power supply input, an under-voltage enable input coupled to the trigger output and to the enable output, and an under-voltage detection output.

6. The integrated circuit of claim 5 including an under-voltage logic circuit having a trigger input coupled to the trigger output, an enable input coupled to the enable output, and an under-voltage enable output coupled to the under-voltage enable input.

7. The integrated circuit of claim 6 in which the under-voltage logic circuit is an OR gate.

8. The integrated circuit of claim 1 in which the deactivation circuitry includes state machine circuitry having a second disable output coupled to the reset input of the first AND gate.

9. The integrated circuit of claim 1 including disable level shifter circuitry having an input coupled to the disable output, a power input coupled to the secondary power supply input, and a level shifted disable output coupled to the reset input of the first AND gate.

10. The integrated circuit of claim 9 including reset logic circuitry having a level shifted disable input coupled to the level shifted disable output, and a reset logic output coupled to the reset input.

11. The integrated circuit of claim 10 in which the reset logic circuitry includes an under-voltage input, and including under-voltage detection circuitry having a power input coupled to the primary power supply input, an under-voltage enable input coupled to the trigger output and to the enable output, and an under-voltage detection output coupled to the under-voltage input.

12. The integrated circuit of claim 11 in which the reset logic circuitry is an OR gate.

13. A system comprising:
   (a) a primary power supply having a primary power output;
   (b) a secondary power supply having a secondary power output separate from the primary power output, and an enable input;
   (c) electronic devices coupled to the secondary power output; and
   (d) a power control system having:
      (i) activation circuitry having a primary power input coupled to the primary power output and receiving power only from the primary input, a control input, a reset input, a trigger output, and an enable output coupled to the enable input, the activation circuitry including a first AND gate having a trigger input coupled to the control input, having a reset input, and having a set output, and latch circuitry having a set input coupled to the set output, having a reset input coupled to the reset input of the first AND gate, and having the enable output; and (ii) deactivation circuitry having a secondary power input coupled to the secondary power output and receiving power only from the secondary power input, and having a trigger input coupled to the trigger output, and a disable output coupled to the reset input, the deactivation circuitry including a second AND gate having an input coupled to the trigger input, having a pulse input, having a deglitch input, and having a disable output coupled to the reset input of the first AND gate.

14. A process of controlling a power system comprising:
(a) powering activation circuitry with first power from a first power supply while disabling second power from a second power supply;

(b) receiving a control signal in the activation circuitry;

(c) activating a trigger signal at an input of a first AND gate in response to the received control signal exceeding a threshold voltage;

(d) latching an asserted second power supply enable signal in response to the trigger signal;

(e) activating the secondary power from the secondary supply including powering deactivation circuitry in response to the asserted second power supply enable signal;

(f) activating a disable signal from an output of second AND gate in response to a disable condition of the system; and (g) latching a second power supply disable signal in response to the activated disable signal.

* * * * *